(12) United States Patent
Williams et al.

(10) Patent No.: US 9,191,150 B2
(45) Date of Patent: Nov. 17, 2015

(54) TRANSMISSION OPPORTUNITY SKIPPING FOR BURST NOISE PROTECTION

(71) Applicant: Cable Television Laboratories, Inc., Louisville, CO (US)

(72) Inventors: Thomas H. Williams, Longmont, CO (US); Belal Hamzeh, Westminster, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 14/259,108

(22) Filed: Apr. 22, 2014

(65) Prior Publication Data

US 2015/0304067 A1    Oct. 22, 2015

(51) Int. Cl.
*H04L 1/00* (2006.01)

(52) U.S. Cl.
CPC .............. *H04L 1/0027* (2013.01); *H04L 1/003* (2013.01); *H04L 1/0042* (2013.01)

(58) Field of Classification Search
USPC .......................................... 375/296, 260, 267
See application file for complete search history.

(56) References Cited

U.S. PATENT DOCUMENTS

2009/0262700 A1* 10/2009 Franceschini et al. ........ 370/330
2011/0164623 A1*  7/2011 Huang et al. .................. 370/474

* cited by examiner

*Primary Examiner* — Kabir A Timory
(74) *Attorney, Agent, or Firm* — Great Lakes Intellectual Property, PLLC

(57) ABSTRACT

Skipping, spreading or otherwise metering signaling across multiple transmission opportunities is contemplated. The contemplated signal processing may be beneficial in ameliorating the influence of burst noise and other interferences on signal transmissions. The contemplated signal processing may be operable to facilitate supplementing and/or replacing other error correction techniques aimed at reducing signaling interference.

17 Claims, 4 Drawing Sheets

TRANSMISSION OPPORTUNITY SKIPPING FOR BURST NOISE PROTECTION

TECHNICAL FIELD

The present invention relates to ameliorating the influence of burst noise and other interferences on signal transmissions, such as by skipping or spreading signaling across multiple transmission opportunities.

BACKGROUND

U.S. patent application Ser. No. 13/538,456, entitled Interleaved Signaling, and U.S. patent application Ser. No. 13/841, 313, entitled Orthogonal Signal Demodulation, the disclosures of which are hereby incorporated by reference in their entireties, relate to the transmission, modulation and demodulation of data through the use of various signaling techniques. The signaling described in the incorporated patent applications, as well as other types of wired and wireless signaling, may be susceptible to impairments added to the transmitted signal as it traverses a signal path. Particularly problematic impairments may result from random noise and/or burst noise. Random noise may be continuous in the time domain and generally flat or "white" in the frequency domain. Burst noise may be strong in amplitude, but relatively short in duration, which may include the noise being wide in frequency. Burst noise may be caused by switching in electrical circuits, such as switching regulated power supplies, switching inductive loads with mechanical contacts, automotive ignitions, and power supplies for lighting such as compact florescent lamps, etc.

Forward error correction (FEC), Reed-Solomon (RS) codes, low-density parity-check codes (LDPC) and error other block FEC techniques, such as but not necessarily limited to those described in the incorporated patent applications, may be used to ameliorate channel errors resulting noise related impairments. One non-limiting aspect of the present invention contemplates supplementing and/or replacing such error correction techniques in order to facilitate ameliorating noise influences on transmitted signaling.

Block codes have overhead, in the form of additional data added to allow FEC. Generally a stronger error correction ability requires more overhead. When a noise burst is received, an efficient block code with low overhead, which was designed to correct random symbol errors associated with Gaussian (random) noise, will be unable to correct all of the errors caused by the burst. This results in an uncorrectable block. A solution that has been implemented is interleaving, where the noise burst is spread over multiple code blocks, and each code block receives a lesser number of symbol errors, resulting in a corrected code block.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
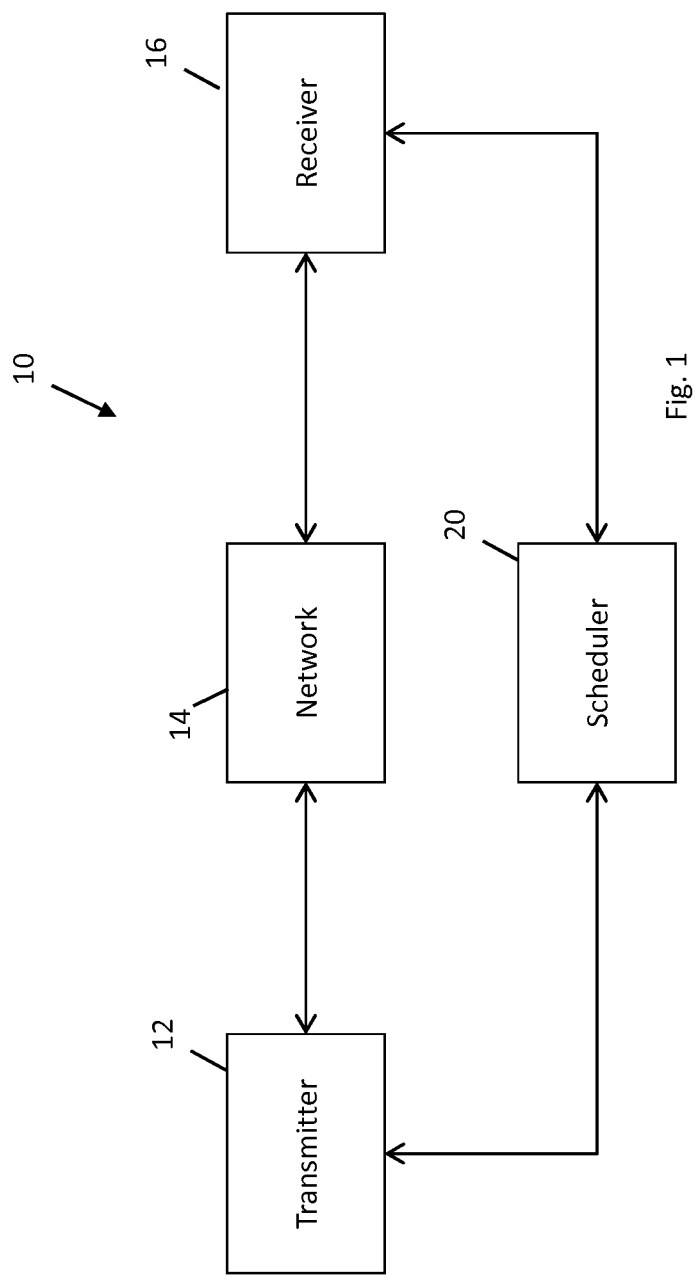
FIG. 1 illustrates a system for transporting signals in accordance with one non-limiting aspect of the present invention.

FIG. 1 illustrates a system 10 for transporting signals in accordance with one non-limiting aspect of the present invention. The system 10 is shown with respect to a transmitter 12 being configured to transport signaling over a network 14 for receipt at a receiver 16. The receiver 16 may be configured to further process the transported signaling for output to a device (not shown) and/or interfacing with a user. The system 10 may be configured to facilitate transporting virtually any type of signaling between a first location/device (e.g., the transmitter 12) and a second location/device (e.g., the receiver 16). Optionally, the signaling transported over or through the network 14 may traverse one or multiple wired and/or wireless mediums before reaching the receiver 16, such as in the manner described in the patent applications referenced above and/or described in U.S. patent application Ser. No. 14/181, 640, filed Feb. 15, 2014, and entitled Multiple-Input Multiple-Output (MIMO) Communication System, the disclosure of which is hereby incorporated by reference in its entirety. The relationship of the transmitter 12 and the receiver 16 is shown for exemplary non-limiting purposes as the present invention fully contemplates the transmitter 12 acting as a receiver or a client in some circumstances and the receiver 16 acting as a transmitter or a server in some circumstance.

The present invention is predominantly described with respect to facilitating signaling over any the network 14 or other sufficient medium between the transmitter 12 and the receiver 16. The network 14 be a public or private network having capabilities sufficient to facilitate processing of signals transmitted according to but not limited to Time Division Multiple Access (TDMA), Frequency Division Multiple Access (FDMA), Orthogonal Frequency Division Multiplexing (OFDM), Orthogonal Frequency Division Multiple Access (OFDMA), Single Carrier Frequency Division Multiple Access (SC-FDMA), code division multiple access (CDMA) and any other modulation technique that allow granular allocation of signals in a time and/or a frequency domain and/or code domain. The network may be configured to facilitate processing signals communicated according to any number of standards and/or protocols, such as but not necessary limited to Data Over Cable Service Interface Specifications (DOCSIS) 3.1, Long Term Evolution (LTE), LTE-Advanced (LTE-A), Wi-Max, Wi-Fi, Digital Video Broadcasting-Terrestrial (DVB-T), Digital Video Broadcasting-Handheld (DVB-H), etc., the disclosures of which are hereby incorporated by reference in their entireties. One non-limiting aspect of the present invention contemplates a scheduler being operable with one or more of the transmitter 12, the network 14 and/or the receiver 16 to facilitate scheduling and/or processing of signals communicated therebetween, regardless of whether signaling is transmitted according to one of the above-identified protocol/standards or another.

The scheduler 20 is shown for exemplary non-limiting purposes as being a standalone item but may be incorporated or otherwise associated with one or more suitable components within the system 10. The scheduler 20 may be configured in accordance in the present invention to facilitate scheduling data for transmission from the transmitter 12 to the receiver 16 via the network 14. One non-limiting aspect of the present invention contemplates the scheduler 20 being configured to facilitate transporting data according to DOCSIS 3.x, which as described in Data-Over-Cable Service Interface Specifications DOCSIS 3.1: Physical Layer Specification CM-SP-PHYv3.1401-131029, the disclosure of what is hereby Incorporated by reference in its entirety. As noted in DOCSIS 3.1, a cable modem (CM), a cable modem termination system (CMTS) or other suitable transmitter and/or receiver 12, 16 may utilize a convergence logical layer between MAC (media access control) and PHY (physical) layers to facilitate OFDM downstream channels and OFDMA upstream channels, such as to map data for transmission. The scheduler 20 may be configured to facilitate mapping or otherwise scheduling data for transmission according to a transmission schedule, e.g., the scheduler 20 may provide instructions to the transmitter 12 sufficient to facilitate partitioning MAC frames into codewords and to map codewords into minislots relative to a transmission schedule utilized by the transmitter to transmit related signaling over the network 14.

Figure 2:
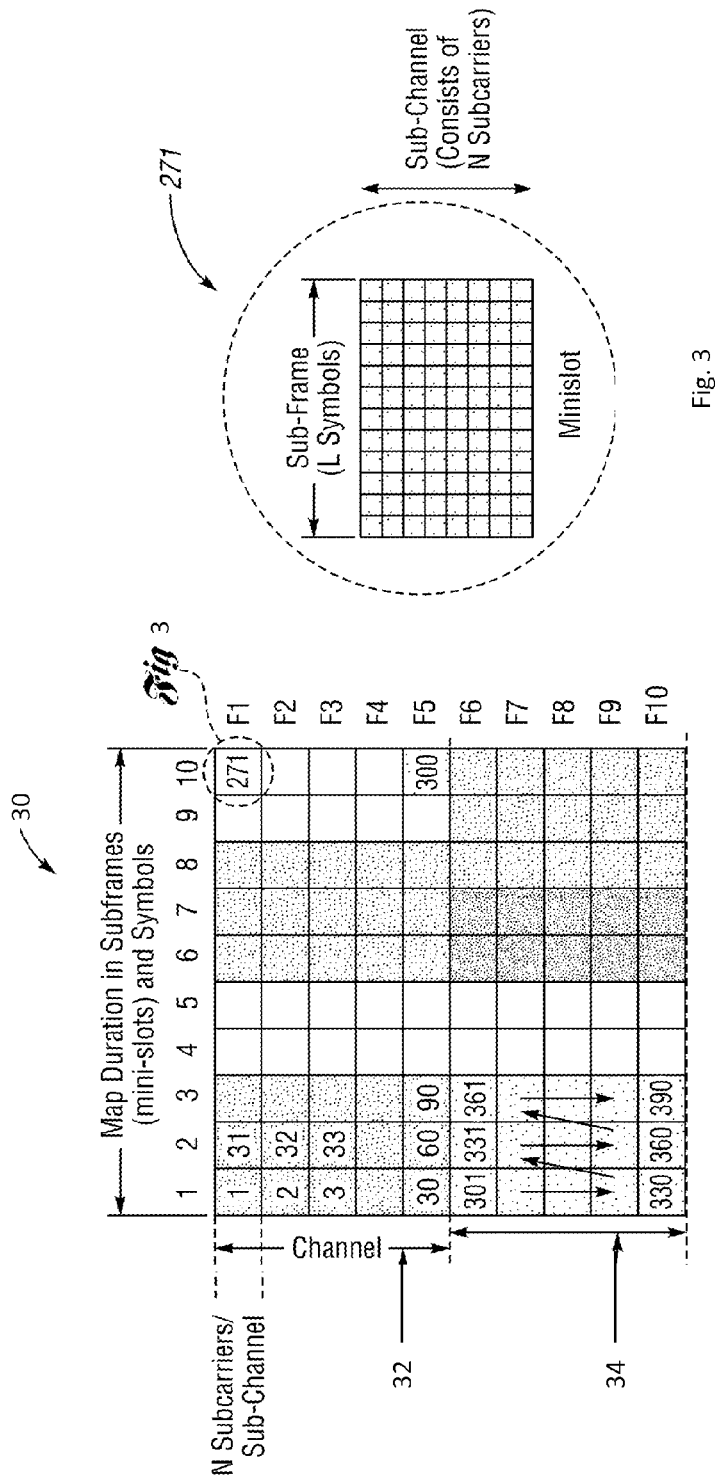
FIG. 2 illustrates a MAP in accordance with one non-limiting aspect of the present invention.
Figure 3:
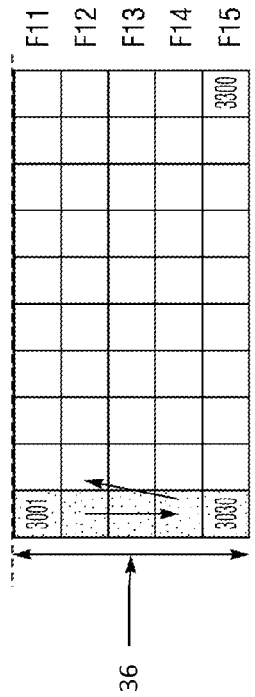
FIG. 3 illustrates one of the minislots in accordance with one non-limiting aspect of the present invention.

FIG. 2 illustrates a MAP 30 in accordance with one non-limiting aspect of the present invention. The MAP 30 may be used to represent network resources or space that is available to facilitate network-based data transmission, such as in the manner described in U.S. patent application Ser. No. 12/827, 496, entitled Systems And Method Of Decoupling Media Access Control (MAC) And Physical (PHY) Operating Layers, the disclosure of which is hereby Incorporated by reference in its entirety. The MAP illustrates a number of channels 32, 34, 36, each associated with a portion of a plurality of minislots (1-3300). Each minislot corresponds with one sub-channel and one sub-frame, the sub-channels corresponding with a frequency (F1-F15) and the sub-frames corresponding with a unit time (1-10). FIG. 3 illustrates one of the minislots in accordance with one non-limiting aspect of the present invention. Each minislot may be used to represent a capacity unit comprised of a number of sub-carriers over time. The sub-carriers may be grouped based on their capacity characteristics to form a sub-channel of constant capacity. One non-limiting aspect of the present invention contemplates collecting or otherwise arranging the sub-carriers such that each minislot totals the same capacity, regardless of the actual number of sub-carriers being used to form each minislot. (As one skilled in the art will appreciate, the amount of data that can be carried by certain sub-carriers can vary according to frequency, network characteristics, etc.).

The frequency (sub-channel) and time (sub-frame) coordinates represented along the vertical axis and the horizontal axis respectively may be used identify a starting frequency (start sub-channel) and an encompassed frequency range (number of sub-channels) as well as a start time (start sub-frame) and a duration (number of sub-frames) of data transmitted over the network. The scheduler 20 may be responsible for supporting the MAP 30 and coordinating scheduling and allocation of the related resources in order to enable the data communications required by the end stations 16 and the services provided therethrough. In order for the data to be transmitted over the network 14, it may be mapped to the two-dimensional MAP 30 (transmission schedule), or a similar two-dimensional MAP, in the event the data is being transmitted over the type of network that allocates resources in two-dimensions as function of frequency and time. The two-dimensional mapping contemplated by the present invention requires detailed knowledge about available sub-carriers and related processing in order to properly group the sub-carriers into the same sized (capacity) sub-channels, including capabilities to monitor available network resources and continuously changing characteristics of the sub-carriers (as one skilled in the art will appreciate, the amount of data each sub-carrier can transport may vary over time according to any number of steady or transient network conditions, such as but not limited to sub-carrier RF level distortion, background noise level, and the presence of burst noise).

The two-dimensional mapping may also require knowledge of the two-dimensional MAP parameters such as the MAP duration in sub-frames and the number of sub-channels to be used for transmission. These parameters may be configurable to achieve the intended performance (latency, robustness). In order the limit the complexity of the MAC layer and/or to allow scaling of the MAC layer to support high speed operations, one non-limiting aspect of the present invention contemplates shielding the MAC layer from having to append data necessary to map the data input, i.e., the logic link control (LLC) frame, to the two-dimensional MAP. The scheduler 20 may be configured to facilitate mapping the codewords to the transmission schedules such that each codeword is scheduled for transmission during one or more of the minislots. The minislots may be defined in the above-described manner relative to a frequency domain and a time domain such that the scheduler 20 may be responsible for scheduling transmission of the codewords relative to the frequency and/or time domains. The foregoing is provided for exemplary non-limiting purposes as one example of a two-dimensional transmission schedule as the present invention fully contemplates its use and application with other types of transmission schedules, including schedules that may be limited in the frequency domain or require signaling to be transmitted at a fixed frequency such that the schedule may only be responsible for scheduling transmission according to the time domain.

Figure 4:
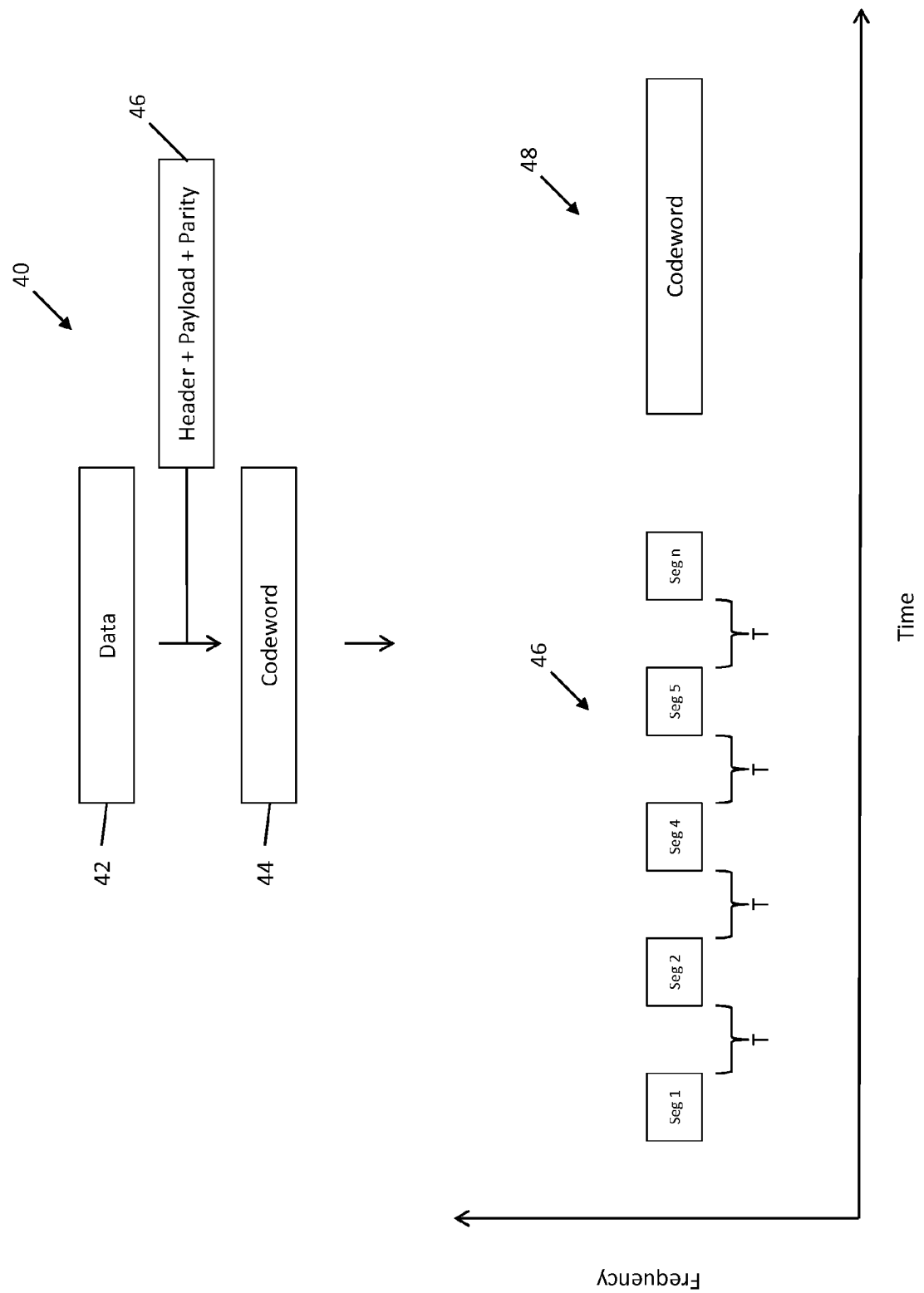
FIG. 4 illustrates a diagram of a method for transmitting data in accordance with one non-limiting aspect of the present invention.

FIG. 4 illustrates a diagram 40 of a method for transmitting data in accordance with one non-limiting aspect of the present invention. The method may be controlled with the scheduler 20 or other device having a non-transitory computer-readable medium with a plurality of instructions operable to facilitate directing, controlling or otherwise implementing the operations contemplated herein. The method is predominantly described for exemplary non-limiting purposes with respect to facilitating data transmissions from the transmitter 12 to the receiver 16. This is done without intending to limit the scope contemplation of the present invention as the operations and processes contemplated herein may be sufficient to facilitate scheduling other types of transmissions besides those associated with the transmitter 12 and the receiver 16. Block 42 relates to identifying data desired for transmission, such as a MAC frame or other identifiable data construct. Block 44 relates to facilitating partitioning of the data into a plurality of codewords, such as in the manner described in DOCSIS 3.1. The partitioning may be characterized by dividing the data desired for transport into a plurality of smaller datasets referred to as codewords due to each of the codewords being assigned parity, forward error correction (FEC), a header and/or or other types of bits/bytes sufficient to distinguish each from one another. The parity data may be added to each codeword to facilitate enabling the receiver 16 to recover missing information or otherwise provide error correction, such as to enable data recovery when signal transmissions are disrupted or otherwise experience interference.

Block 46 relates to adding the parity (FEC etc.) to the data while being partitioned into each codeword. Following the partitioning, each codeword may comprise a header portion, a payload portion and a parity portion. (Optionally, the header portion may be eliminated or unnecessary in some implementations of the present invention, such as when if a CMTS is expecting the transmission and/or the CMTS told the transmitter when and at what frequency to transmit). If generated in accordance with DOCSIS 3.1 a full codeword may be comprised of 2025 bytes (16200 bits) divided into 225 bytes (1800 bits) of parity and 1800 bytes (14400 bits) of low-density parity check (LDPC) payload. That payload may be further divided into 21 bytes (168 bits) of Bose, Ray-Chaudhuri, Hocquenghem (BCH) parity, a 2 byte fixed header, and a variable 1777 byte maximum payload for DOCSIS frames. The partitioning of the data into the codewords may be characterized by each codeword comprising a certain number of bits allocated to each of the header, payload and parity portion. While the partitioning is predominantly described with respect to generating codewords, other data construct having a similar function or partitioning may be utilized without deviating from the scope contemplation of the present invention, e.g., some protocols or standards may use any linear block code as an equivalent to the described codeword. The scheduler 20 may be configured in accordance with the present invention to facilitate scheduling transmission of the codewords in a manner aimed at ameliorating the influences of burst noise or other signal disruptions.

The scheduler 20 may schedule transmission of the codewords to ameliorate the influences of burst noise or other signal disruptions by segmenting one or more of the codewords desired for transmission into a plurality of segments. The segments may each comprise a portion of the total number of bits corresponding with the associated codeword such that all segments in total equals or exceeds the same number of bits as in the corresponding codeword. Optionally, data may be added to each codeword to facilitate re-constructing and/or other operations at the receiver once all segments are received. FIG. 4 illustrates a scenario where the scheduler 20 schedules transmission of a first codeword 46 and a second codeword 48 such that the first codeword 46 is segmented into a first, second, third, fourth and fifth segment (seg 1, seg 2, . . . seg n) and the second codeword 48 is not segmented. The segmentation of the first codeword 46 may be characterized by each of the corresponding segments being spaced apart in the time domain, which for exemplary non-limiting purposes is shown to correspond with a time interval (T) defining the equal spacing of each segment. The scheduler 20 may selectively determine the time interval (T) according to any number of variables and parameters and may adjust the interval between each segment to facilitate desired signal transports, i.e., each of the segments need not necessarily be equally spaced from each other in the time domain. The second codeword 48 illustrates a total number of bits comprising the second codeword 48 being scheduled for successive transmission such that each bit occurring from a beginning bit to and an ending bit is transmitted in adjoining sequence, i.e., without any gaps or separation within the time domain. Segmentation may be done, for example, in response to the detection of burst noise on the (upstream) channel. Those skilled in the art will recognize that segmentation causes increased latency, but a small increase in latency may be much preferable to the data stopping. Furthermore, the time intervals (T) represent signaling (transmission) opportunities for other users. The timing of the time intervals (T) may be set to align with noise peaks associated with the 60 or 50 Hz power line frequencies. Switching regulator noise has been observed to increase and decrease at a 120 Hz rate with 60 Hz AC power because of switching of rectifier diodes in switching power supplies.

The scheduler 20 may be configured to facilitate scheduling the transmission of the first and second codewords 46, 48 by assigning the segments to individual minislots such that at least one minislot separates each segment of the first codeword 46 and such that no minislots separate the beginning and the ending bits of the second codeword 48. Of course, the present invention is not necessarily so limited and fully contemplates the scheduler 20 being configured to facilitate scheduling transmission according to other units of time besides minislots. The scheduler 20 may also be configured to facilitate segmenting the second codeword 48 or any additional number of codewords partitioned from the data in a manner similar to that described with respect to the first codeword 46, optionally with each segment of a corresponding codeword having the same skipped time interval (T) or other time interval uniquely determined for its transmission. The scheduler 20 may be configured to facilitate scheduling the second codeword 48 or any additional codeword being segmented such that one or more of the segments associated therewith are scheduled to occur within the interval T occurring between one or more of the segments associated with the first codeword 46 or another codeword, e.g., a first segment (seg 1) and a second segment (seg 2) of the first codeword 46 may be scheduled and then a first segment of a second codeword (not shown) may be scheduled to occur therebetween such that at least one segment of the first codeword 46 adjoins a segment of the second codeword.

One non-limiting aspect of the present invention contemplates the scheduler 20 or other device having an algorithm or other logic sufficient to facilitate determining segmentation of the codewords and a skipping interval (e.g., time interval T). A first segment value (S) representative of the number of segments associated with the first codeword or other segmented codewords may be determined according to the following: S=x.ceil(m/k), wherein x=a segmentation factor ≥1; m=length of the first codeword in bits; and k=maximum correctable number of bits. The segmentation factor may be selected to be one in order to determine a minimum number of segments and selected to be a higher value is more segments are desired. The number of segments influences the duration or time taken to transmit a particular codeword and the likelihood that the codeword is affected by a noise burst, e.g., a greater number of segmentations takes longer to transmit but is less likely to be affected by a noise burst in comparison to a lesser number of segmentations. The m and k values may be design parameters associated with typical codeword sizes and/or other values characteristics of network transmissions and may be set to other variables such as symbols, etc.

The skipping interval or time interval (T) may be determined according to the following: T=ceil[((P*B)/(k/Rb*S))−1], wherein B=a duration of a burst noise; P=percentage of the burst noise anticipated to affect transmission of the data; Rb=a transmission rate of the first codeword; and S=the segmentation value determined above. The duration of the burst noise B may be measured or estimated to reflect a known burst noise and/or an anticipated burst noise. The percentage P of the burst noise anticipated to affect the transmission may be determined to be 80% or some other value sufficient to indicate how much of the burst noise will actually affects signal transmissions, e.g., the burst noise may experience a rise at a beginning and a drop at an end such that only the portion occurring therebetween may be relevant for calculation purposes. Optionally, such as to ensure success of the forward error correction or other parity-based processes, the percentage P may be selected to be less than or equal to k/m. The transmission rate Rb may be determined by the communication medium, network or other transmission capabilities associated with facilitate signaling between the transmitter and the receiver and may vary over time according to congestion or other network variables. In this manner, the skipping interval may be determined in the time domain to facilitate spacing each segment associated with a comment codeword. The time unit associated with the skipping interval T may vary according to the transmission schedule or other intervals at which the transmitter 12 may be able to time signal transmissions, e.g., the interval T may be a value where the units are relative to the transmission schedule or capabilities of the transmitter 12.

Once the segmentation interval (S) and the skipping interval (T) are determined, the scheduler 12 may be configured to facilitate providing suitable instructions to the transmitter 12 and/or the receiver 16. The instructions may be sufficient for enabling the transmitter 12 to schedule a transmission of the corresponding segments and/or codewords according to the appropriate transmission schedule (e.g., a transmission schedule similar to that shown in FIG. 2 where segments may be scheduled in the time and/or frequency domains). The scheduler 20 may provide instructions to the receiver 16 having spacing information sufficient to facilitate buffering the segments associated with each codeword. The receiver 16 may utilize the spacing information to identify time periods when to clock into a buffer in order to facilitate buffering the segments, e.g., when expecting to receive when the segments, the receiver 16 May clock into the transmitted signaling and thereafter clock out in order to reduce the amount of data being buffered for processing. Of course, the instructions provided to the receiver 16 may vary depending on the capabilities of the receiver and its ability to selectively buffer and/or to selectively store data or other signaling transmitted thereto.

Figure 5:
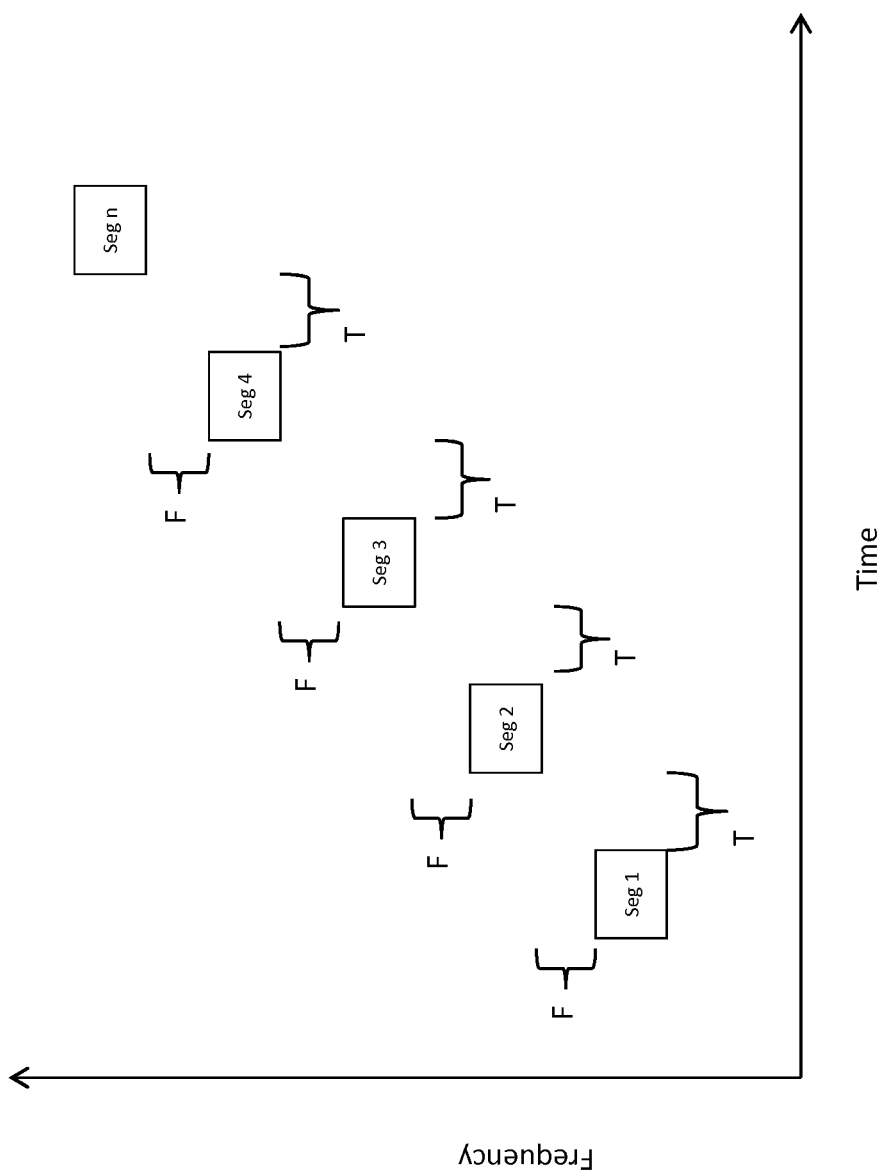
FIG. 5 illustrates a diagram of a method for transmitting data in accordance with one non-limiting aspect of the present invention.

FIG. 5 illustrates a diagram of a method for transmitting data in accordance with one non-limiting aspect of the present invention. The scheduling associated with FIG. 5 is shown to be variable relative to both of a time domain and a frequency domain whereas the scheduling associated with FIG. 4 is shown to be variable relative to the time domain. The scheduler may be configured to facilitate scheduling according to the frequency and time domains in the manner similar to that described above with respect to FIG. 4, e.g., identifying a number of segments and then identifying an offset or skipping to be performed between each segment. The additional frequency domain scheduling may include scheduling segments such that segments skipping occurs relative to a time interval T as well as a frequency interval F. The frequency interval F may be selected for similar purposes as that described above with respect to the selection of the time interval T, e.g., to facilitate transmitting codewords across different frequencies in order to ameliorate the likelihood of interferences affecting an entirety of the corresponding codeword. As with the time interval T, the frequency interval F is shown to correspond with equal frequency spacing between each of the segments for exemplary non-limiting purposes as the frequency interval F may be selected to vary between segments and/or as a function of individual codewords. This embodiment would have a relative advantage against an intermittent narrowband interferer, such as Ham radio traffic.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for transmitting data comprising:
partitioning the data into a plurality of codewords, each codeword including a plurality of bits arranged into a header portion, a payload portion and a parity portion;
identifying at least a first codeword of the plurality of codewords, the first codeword having a first plurality of bits arranged into the header portion, the payload portion and the parity portion;
segmenting the first codeword into a first plurality of segments, each of the first plurality of segments including a different portion of the first plurality of bits such that no single one of the first plurality of segments includes bits associated with more than two of the header portion, the payload portion and the parity portion;
scheduling the first codeword for transmission within a time domain such that each of the first plurality of segments are equally spaced apart in the time domain by a first time; and
transmitting clocking instructions sufficient for a buffer to clock into signaling carrying the first codeword at a beginning of each of the first plurality of segments and to clock out of the signaling at an ending of each of the first plurality of segments.

2. The method of claim 1 further comprising determining a first segment value (S) representative of the number of segments comprising the first plurality of segments according to the following:
S=x.ceil(m/k), wherein x=a segmentation factor ≥1; m=length of the first codeword in bits; and k=maximum correctable number of bits.

3. The method of claim 2 further comprising determining the first time (T) according to the following:
T=ceil[((P*B)/(k/Rb*S))−1], wherein B=a duration of a burst noise; P=percentage of the burst noise anticipated to affect transmission of the data; and Rb=a transmission rate of the first codeword.

4. The method of claim 1 further comprising scheduling each of the first plurality of segments for transmission within a frequency domain such that each of the first plurality segments are equally spaced in the frequency domain by a first frequency.

5. The method of claim 1 further comprising scheduling each of the first plurality of bit for transmission according to one of Orthogonal Frequency Division Multiplexing (OFDM), Orthogonal Frequency Division Multiple Access (OFDMA), Single Carrier Frequency Division Multiple Access (SC-FDMA).

6. The method of claim 1 further comprising scheduling each of the first plurality of segments for wireless transmission.

7. The method of claim 1 further comprising scheduling each of the first plurality of segments for wireline transmission.

8. The method claim 1 further comprising scheduling the first plurality of segments for transmission relative to a transmission schedule, the transmission schedule including a plurality of minislots where each minislot corresponds with a unit of time in the time domain, including scheduling at least one minislot to be skipped between each of the first plurality of segments.

9. The method of claim 1 further comprising:
identifying at least a second codeword of the plurality of codewords, the second codeword having a second plurality of bits arranged into the header portion, the payload portion and the parity portion, a beginning bit of the second plurality of bits being at a beginning of the header portion and an ending bit of the second plurality of bits being that an ending of the parity portion, a quantity of the second plurality of bits equaling a total number of bits occurring between the beginning bit and the ending bit; and scheduling the second codeword for transmission within in the time domain such that each of the second plurality of bits are sequentially adjoined in the time domain from the beginning bit to the ending bit.

10. The method claim 9 further comprising scheduling the first and second codewords for transmission relative to a transmission schedule, the transmission schedule including a plurality of minislots where each minislot corresponds with a unit of time in the time domain, including scheduling the second codewords such that no minislots are skipped between the beginning bit and the ending bit.

11. A non-transitory computer-readable medium having a plurality of instructions operable with a processor of a scheduler to facilitate scheduling transmission of data according to a transmission schedule, the instructions being sufficient for:
   determining a partitioning of the data into a plurality of codewords;
   scheduling a first codeword of the plurality of codewords to be transmitted as a first plurality of segments where each of the first plurality of segments are spaced apart from each other in a time domain such that none of the first plurality of segments adjoin each other within the transmission schedule; and
   transmit clocking instructions sufficient for a buffer to clock into signaling carrying the first codeword at a beginning of each of the first plurality of segments and to clock out of the signaling at an ending of each of the first plurality of segments.

12. The non-transitory computer-readable medium of claim 11 further comprising instructions sufficient for scheduling a second codeword of the plurality codewords to be transmitted as a second plurality of segments where each of the second plurality of segments are spaced apart from each other in the time domain such that none of the second plurality of segments adjoin each other within the transmission schedule.

13. The non-transitory computer-readable medium of claim 12 further comprising instructions sufficient for scheduling the first and second codewords such that at least one of the first plurality of segments are scheduled to be transmitted in the time domain next to at least one of the second plurality of segments, thereby resulting in at least one of the first plurality of segments adjoining at least one of the second plurality of segments within the transmission schedule.

14. The non-transitory computer-readable medium of claim 11 further comprising instructions sufficient for determining a first segment value (S) representative of the number of segments comprising the first plurality of segments according to the following:
   $S=x.ceil(m/k)$, wherein $x=$a segmentation factor $\geq 1$; $m=$length of the first codeword in bits; and $k=$maximum correctable number of bits.

15. The non-transitory computer-readable medium of claim 11 further comprising instructions sufficient for scheduling the first plurality of segments such that each of the first plurality of segments are equally spaced apart in the time domain by a first time, including determining the first time (T) according to the following:
   $T=ceil[((P*B)/(k/Rb*S))-1]$, wherein $B=$a duration of a burst noise; $P=$percentage of the burst noise anticipated to affect transmission of the data; and $Rb=$a transmission rate of the first codeword.

16. A signaling system comprising:
   a transmitter configured to process data for transmission to a receiver;
   wherein the transmitter is operable to partition the data into a plurality of codewords, including adding forward error correction (FEC) bits to each of the codewords in order to enable the receiver to perform error correction operations;
   wherein the transmitter is operable to schedule transmission of the codewords relative to a plurality of minislots defined within a transmission schedule;
   wherein the transmitter is operable to schedule segmented transmission of at least a first codeword of the plurality of codewords such that the first codeword is transmitted as a first plurality of segments where each of the first plurality of segments are separated from each other by at least one of the plurality of minislots;
   wherein the receiver includes a buffer operable to buffer the first plurality of segments by selectively clocking into signaling received at an input; and
   wherein the transmitter is operable to transmit clocking instructions to the receiver sufficient for the receiver to clock into the signaling at a beginning of each of the first plurality of segments and to clock out of the signaling at an ending of each of the first plurality of segments.

17. The signaling system claim 16 wherein the transmitter is operable to:
   determine a first segment value (S) representative of the number of segments comprising the first plurality of segments according to $S=x.ceil(m/k)$, wherein $x=$a segmentation factor $\geq 1$; $m=$length of the first codeword in bits; and $k=$maximum correctable number of bits; and
   schedule the first plurality of segments such that each of the first plurality of segments are equally spaced apart by a first number of minislots, including determining the first number of minislots (T) according to the following:
   i) $T=ceil[((P*B)/(k/Rb*S))-1]$, wherein $B=$a duration of a burst noise; $P=$percentage of the burst noise anticipated to affect transmission of the data; and $Rb=$a transmission rate of the first codeword.

* * * * *